US011218341B2

(12) United States Patent
Zhang et al.

(10) Patent No.: US 11,218,341 B2
(45) Date of Patent: Jan. 4, 2022

(54) CHANNEL ESTIMATION

(71) Applicant: Telefonaktiebolaget LM Ericsson (publ), Stockholm (SE)

(72) Inventors: Johan Zhang, Solna (SE); Chenguang Lu, Sollentuna (SE); Yu Wang, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/652,386

(22) PCT Filed: Nov. 6, 2017

(86) PCT No.: PCT/SE2017/051103
§ 371 (c)(1),
(2) Date: Mar. 30, 2020

(87) PCT Pub. No.: WO2019/088890
PCT Pub. Date: May 9, 2019

(65) Prior Publication Data
US 2020/0322188 A1 Oct. 8, 2020

(51) Int. Cl.
*H04L 25/02* (2006.01)
*H04B 7/06* (2006.01)
(Continued)

(52) U.S. Cl.
CPC ....... *H04L 25/0228* (2013.01); *H04B 7/0626* (2013.01); *H04L 5/0051* (2013.01); *H04W 72/1273* (2013.01)

(58) Field of Classification Search
CPC ............. H04W 72/1273; H04W 72/12; H04W 72/121; H04L 25/0228; H04L 25/0214;
(Continued)

(56) References Cited

U.S. PATENT DOCUMENTS 7,474,641 B2 * 1/2009 Kuroda ............... H04L 27/12
370/329
10,404,336 B1 * 9/2019 Zheng ............... H04L 25/0204
(Continued)

FOREIGN PATENT DOCUMENTS

EP 2395784 A1 12/2011
WO 2014/068522 A1 5/2014

OTHER PUBLICATIONS

Berardinelli et al., "Turbo Receivers for Single User MIMO LTE-A Uplink", VTC Spring 2009—IEEE 69th Vehicular Technology Conference, Jun. 2009, pp. 1-5.
(Continued)

*Primary Examiner* — Phong La
(74) *Attorney, Agent, or Firm* — NDWE LLP

(57) ABSTRACT

A method in a first base station in a communications network for performing channel estimation of a first wireless channel between a first wireless device and the first base station. A signal comprising a first component is received over the first wireless channel, the first component corresponding to a first reference signal transmitted by the first wireless device to the first base station, and a second component, wherein at least part of the second component corresponds to a second reference signal transmitted by a second wireless device to a second base station. Also, receiving scheduling information according to which the second wireless device is scheduled to transmit the second reference signal to the second base station; generating, a constructed reference signal representative of the second reference signal; and performing channel estimation of the first wireless channel between the first wireless device and the first base station.

16 Claims, 15 Drawing Sheets

(51) Int. Cl.
*H04L 5/00* (2006.01)
*H04W 72/12* (2009.01)

(58) Field of Classification Search
CPC ............. H04L 25/0224; H04L 25/0202; H04L 25/0204; H04L 25/0206; H04L 25/024; H04L 5/0051; H04L 5/0053; H04L 5/0048
See application file for complete search history.

(56) References Cited

U.S. PATENT DOCUMENTS

| | | | |
|---|---|---|---|
| 2013/0315191 A1* | 11/2013 | Yoshimoto | H04J 11/0056 370/329 |
| 2014/0126480 A1 | 5/2014 | Comeau et al. | |
| 2015/0085690 A1* | 3/2015 | Yi | H04W 24/02 370/252 |
| 2016/0044646 A1* | 2/2016 | Seyama | H04J 11/005 370/330 |
| 2017/0104612 A1* | 4/2017 | Kuroda | H04L 1/0656 |
| 2018/0097667 A1* | 4/2018 | Yoo | H04L 45/28 |
| 2020/0220677 A1* | 7/2020 | Interdonato | H04L 5/0058 |
| 2020/0287754 A1* | 9/2020 | Stathakis | H04L 25/0204 |

OTHER PUBLICATIONS

International Search Report and Written Opinion, PCT App. No. PCT/SE2017/051103, dated Sep. 25, 2018, 18 pages.

Koetter et al., "Turbo Equalization: An Iterative equalization and decoding technique for coded data transmission", IEEE Signal Processing Magazine, Jan. 2004, pp. 67-80.

3GPP TS 36.211 V13.0.0, "3rd Generation Partnership Project; Technical Specification Group Radio Access Network Evolved Universal Terrestrial Radio Access (E-UTRA); Physical channels and modulation (Release 13)," Dec. 2015, 141 pages, 3GPP Organizational Partners.

International Preliminary Report on Patentability, PCT App. No. PCT/SE2017/051103, dated May 22, 2020, 14 pages.

Communication under Rule 71(3) EPC for EP Application No. 17804004.4, dated Oct. 7, 2021, 148 pages.

* cited by examiner

CHANNEL ESTIMATION

CROSS-REFERENCE TO RELATED APPLICATIONS

This application is a National stage of International Application No. PCT/SE2017/051103, filed Nov. 6, 2017, which is hereby incorporated by reference.

TECHNICAL FIELD

Embodiments described herein relate to methods and apparatus for performing channel estimation of a first wireless channel between a wireless device and a base station in a wireless communications network.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Interference may be a fundamental problem in any wireless communications network using any form of communications technology, for example for cellular systems such as Long Term Evolution (LTE), 5G New Radio (NR) and Narrowband Internet-of-Things (NB-IoT). In principle, cellular systems may be limited by the level of interference within the system.

Interference in cellular systems can cause undesirable effects such as capacity degradations within the cellular system. For reasons such as this, interference mitigation and/or suppression is an area of interest. For the specific case of cell edge users, in other words, users of wireless devices operating towards the edge of a cell or beam in a cellular network, interference mitigation schemes can greatly improve the performance of the wireless devices and therefore the user experiences.

Wireless devices operating close to, or towards the edge of a cell or beam within a wireless communications network may experience interference caused by wireless devices in neighboring cells or beams. This can lead to poor user experiences resulting from low bit rates and dropped calls. It may therefore be important that such interferences are mitigated. For providing such mitigation of the interference, beamforming has been considered as a promising solution to improve the SINR of the wireless device whose communications are being interfered with. For example, in the uplink direction, interference rejection combining (IRC) may be used in multi-antenna systems to improve the Signal-to-Interference-plus-Noise Ratio (SINR).

IRC is a beamforming scheme with multiple antennas at the receiver mitigating the interferences from the neighboring cells utilizing estimated interference and noise covariance matrix, thereby improving the SINR of the wireless device experiencing such interferences. However, the performance of IRC relies on the quality of a channel estimation of the channel between the wireless device and the base station. In other words, the performance of the IRC relies on the channel estimation quality of the interference covariance matrix of the interference channel. A poor channel estimate may lead to severe performance degradation.

SUMMARY

According to the present disclosure there is provided a method in a first base station operable in a communications network for performing channel estimation of a first wireless channel between a first wireless device and the first base station. The method comprises receiving a signal comprising a first component received over the first wireless channel, the first component corresponding to a first reference signal transmitted by the first wireless device to the first base station, and a second component, wherein at least part of the second component corresponds to a second reference signal transmitted by a second wireless device to a second base station. The method further comprises receiving scheduling information according to which the second wireless device is scheduled to transmit the second reference signal to the second base station; generating, based on the scheduling information, a constructed reference signal representative of the second reference signal; and performing channel estimation of the first wireless channel between the first wireless device and the first base station based on the signal and the constructed reference signal.

According to another aspect there is provided a method in a second base station for providing scheduling information for use in channel estimation of a first wireless channel between a first wireless device and a first base station, wherein the first base station is a neighbouring base station to the second base station. The method comprises in response to an indication that a second wireless device communicating with the second base station will interfere with communications between the first wireless device and the first base station, transmitting to the first base station scheduling information according to which the second wireless device is scheduled to transmit a second reference signal to the second base station.

According to another aspect there is provided a first base station operable in a wireless communications network for performing channel estimation of a first wireless channel between a first wireless device and the base station. The base station comprises a processor and a memory, said memory containing instructions executable by said processor, wherein said processor is operative to: receive a signal comprising a first component received over the first wireless channel, the first component corresponding to a first reference signal transmitted by the first wireless device to the first base station, and a second component, wherein at least part of the second component corresponds to a second reference signal transmitted by a second wireless device to a second base station. The processor is further operable to receive scheduling information according to which the second wireless device is scheduled to transmit the second reference signal to the second base station; generate, based on the scheduling information, a constructed reference signal representative of the second reference signal; and perform channel estimation of the first wireless channel between the first wireless device and the first base station based on the signal and the constructed reference signal.

According to another aspect there is provided a second base station for providing scheduling information for use in channel estimation of a first wireless channel between a first wireless device and a first base station, wherein the first base station is a neighbouring base station to the second base station. The second base station comprises a processor and a memory, said memory containing instructions executable by said processor, wherein said processor is operative to: in response to an indication that a second wireless device communicating with the second base station will interfere with communications between the first wireless device and the first base station, transmit to the first base station scheduling information according to which the second wireless device is scheduled to transmit a second reference signal to the second base station.

According to another aspect there is provided a method implemented in a communication system including a host computer, a base station and a user equipment (UE). The method comprises at the host computer, providing user data; and at the host computer, initiating a transmission carrying the user data to the UE via a cellular network comprising the base station, wherein the base station performs any of the steps of the method described above.

According to another aspect there is provided a communication system including a host computer. The communication system comprises processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of methods described above.

According to another aspect there is provided a computer program product comprising instructions which, when executed on at least one processor, cause the at least one processor to carry out a method as described above.

According to another aspect there is provided a computer program product comprising a computer program as described above.

Embodiments disclosed herein present a method enabling an improved channel estimation in the uplink direction, which in turn facilitates interference mitigation schemes, for example Interference Rejection Combining (IRC), zero forcing (ZF), Minimum Mean Squared Error (MMSE), resulting in an improvement in the SINR of wireless devices which are subject to interferences from wireless devices operating in neighboring cells. The presented embodiments may be implemented for any suitable technology, for example LTE, NR and NB-IoT, which are all based on Orthogonal Frequency-Division Multiplexing (OFDM).

BRIEF DESCRIPTION OF THE DRAWINGS

For a better understanding of the present disclosure, and to show how it may be put into effect, reference will now be made, by way of example only, to the accompanying drawings, in which.

DESCRIPTION

Figure 1:
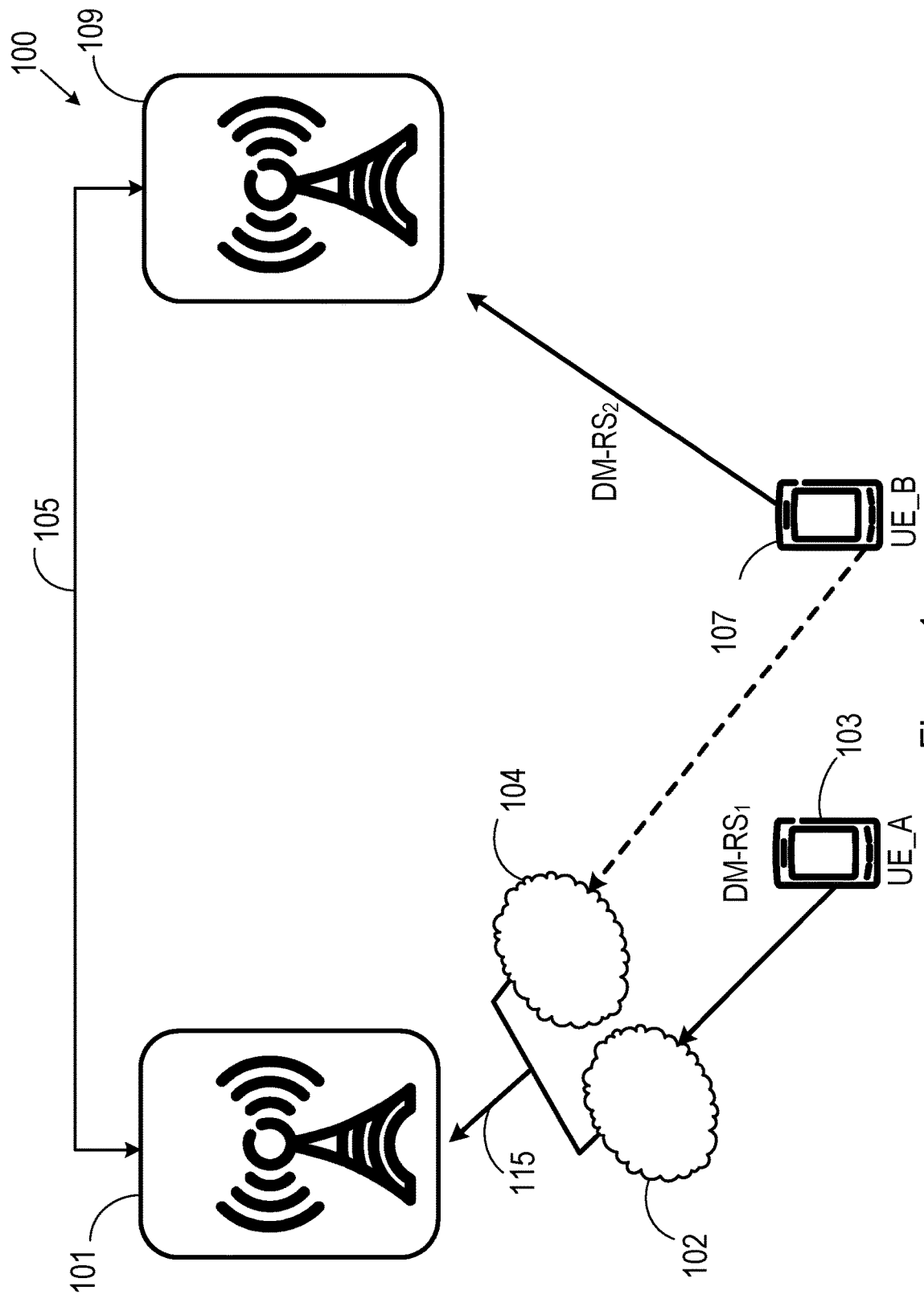
FIG. 1 illustrates a network according to some embodiments.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Embodiments described herein provide an improved channel estimation for a wireless channel between a wireless device and a base station in a wireless communications network. This improved channel estimation may then be used in interference mitigation techniques.

A number of different interference mitigation techniques may be used. For example, interference mitigation techniques which rely on channel estimation to suppress the interference may benefit from the embodiments disclosed herein. For example, Interference rejection combining (IRC) utilizes the channel estimation when suppressing the interference. This technique is therefore dependent on a good channel estimation in order to suppress the interference effectively.

In LTE and NR, channel estimation may be performed by utilizing reference signals, for example demodulation reference signals (DM-RS). For a particular cell, the reference signals, for example the DM-RS, may be designed such that they are fully de-correlated. In other words, a cross-correlation between the DM-RS signals transmitted by different wireless devices within a particular cell may be zero. For a particular wireless channel between a wireless device and a base station, the channel coefficients may be estimated by performing cross-correlation operations between what is received over the wireless channel during a particular time period and the reference signal which is known to have been transmitted by the wireless device during that time period. Embodiments disclosed herein make use of the fact that reference signals transmitted by different wireless devices operating within a cell, and even reference signals transmitted by different wireless devices operating in different cells, may be highly de-correlated. Performing interference cancellation based on this decorrelation property may improve channel estimations, and thereby improve the interference mitigation.

Channel estimation may be performed by directly estimating the wireless channel between a wireless device and a base station using a received reference signal, for example DM-RS, from the wireless device. However, the signal received at the base station may comprise a first component corresponding to the reference signal transmitted by the wireless device and a second component corresponding to interfering reference signals, e.g. DM-RS transmitted by one or more wireless devices in a neighboring cell(s).

In some examples, this interference may be overcome by performing the channel estimation with a blind estimation of the interference reference signal(s). However, this may potentially lead to computationally very complex algorithms.

In some embodiments therefore, if a first wireless device being served by a first base station is suffering from interference caused by a second wireless device communicating with a second base station, the second base station may transmit scheduling information for the second wireless device to the first base station. The first base station may then regenerate a constructed reference signal representative of a reference signal which the second wireless device is due to transmit, and use this constructed reference signal to determine an estimate of the interference caused by the transmission of the reference signal by the second wireless device. By taking the reference signal transmitted by the second wireless device into account when estimating a first wireless channel between the first wireless device and the first base station, the first base station is able to improve the channel estimation for the first wireless channel.

By utilizing these improved channel estimations in interference mitigation schemes such as IRC, the throughput from the first wireless device in the uplink direction may be improved.

FIG. 1 illustrates a wireless communications network 100 according to some embodiments.

The wireless communications network 100 comprises two base stations, 101 and 109. It will be appreciated that the wireless communications network 100 may comprise any number of base stations. The base stations 101 and 109 are, in this example, neighboring base stations serving neighboring cells. In particular, the first base station 101 is serving a first wireless device 103. The second base station 109 is serving a second wireless device 107.

The transmissions from the second wireless device 107 to the second base station 109 may interfere with the transmissions from the first wireless device 103 to the first base station 101 and vice versa.

It may therefore be desirable for the first base station 101 to perform interference mitigation to suppress interference caused by the communications between the second wireless device 107 and the second base station 109. The interference mitigation may comprise Interference Rejection Combining (IRC), which relies on an estimation of the first wireless channel 102 between the first base station and the first wireless device 103. Other interference mitigation techniques may also rely on an estimate of the first wireless channel 102.

In order to estimate the first wireless channel 102, the first base station 101 may utilize a first reference signal $DM\_RS_1$, for example a demodulation reference signal, transmitted by the first wireless device 103 to the first base station. For example, as the first reference signal $DM\_RS_1$ is known by the first base station, the first base station may cross-correlate the first reference signal $DM\_RS_1$ with the signal 115 received at the first base station 101. In an example where no reference signal is received from other wireless devices in neighboring cells, if the first reference signal $DM\_RS_1$ is unchanged by its passage through the first wireless channel 102 between the first base station 101 and the first wireless device 103, then the first reference signal $DM\_RS_1$ will have a perfect positive correlation with the signal 115 received at the first base station 101. If not, channel coefficients describing the effect of the first wireless channel 102 on the first reference signal $DM\_RS_1$ as it is transmitted from the first wireless device 103 to the first base station 101 can be estimated from the cross-correlation value.

However, this example does not take into account any reference signals which may be received by the first base station 101 in conjunction with the first reference signal $DM\_RS_1$. In other words, the second wireless device 107 may be scheduled to transmit a second reference signal $DM\_RS_2$ to the second base station 109 using at least some of the same radio resources that are scheduled for use by the first wireless device 103 in transmitting the first reference signal $DM\_RS_1$ to the first base station. Furthermore, in some examples, the second wireless device 107 may be close enough to the first base station 101, that the first base station 101 receives the second reference signal $DM\_RS_2$.

Therefore, if the first base station 101 cross-correlates the first reference signal $DM\_RS_1$ with the received signal 115, the resulting correlation may be affected by the fact that the received signal 115 may comprise two components, for example, a first component which corresponds to the first reference signal $DM\_RS_1$, and a second component, wherein at least part of the second component corresponds to the second reference signal $DM\_RS_2$. Therefore a cross-correlation between the first reference signal and the signal 115 may not result in accurate coefficients for describing the first wireless channel 102, due to the non-zero value of the cross-correlation with the second component.

Therefore, in some embodiments, the second base station 109 may be configured to transmit scheduling information 105 to the first base station 101 according to which the second wireless device 107 is scheduled to transmit the second reference signal $DM\_RS_2$ to the second base station 109. The first base station 101 may then be able to generate, from the scheduling information, a constructed reference signal representative of the second reference signal $DM\_RS_2$ for use in channel estimation.

By using the scheduling information 105 in performing the channel estimation, the first base station may improve the interference suppression, which in turn may increase the uplink (UL) throughput for the wireless devices in the cell, for example, for cell edge users. Embodiments disclosed herein may be performed together with other suitable uplink enhancing algorithms such as Coordinated Multi-point (CoMP), Transmit Time Interval (TTI) bundling, frequency-hopping for mitigating interferences. The embodiments disclosed herein may for example, be applied to any suitable radio-access technology, such as Narrow-Band Internet of Things (NB-IoT), Voice Over LTE (VoLTE), LTE and NR.

Figure 2:
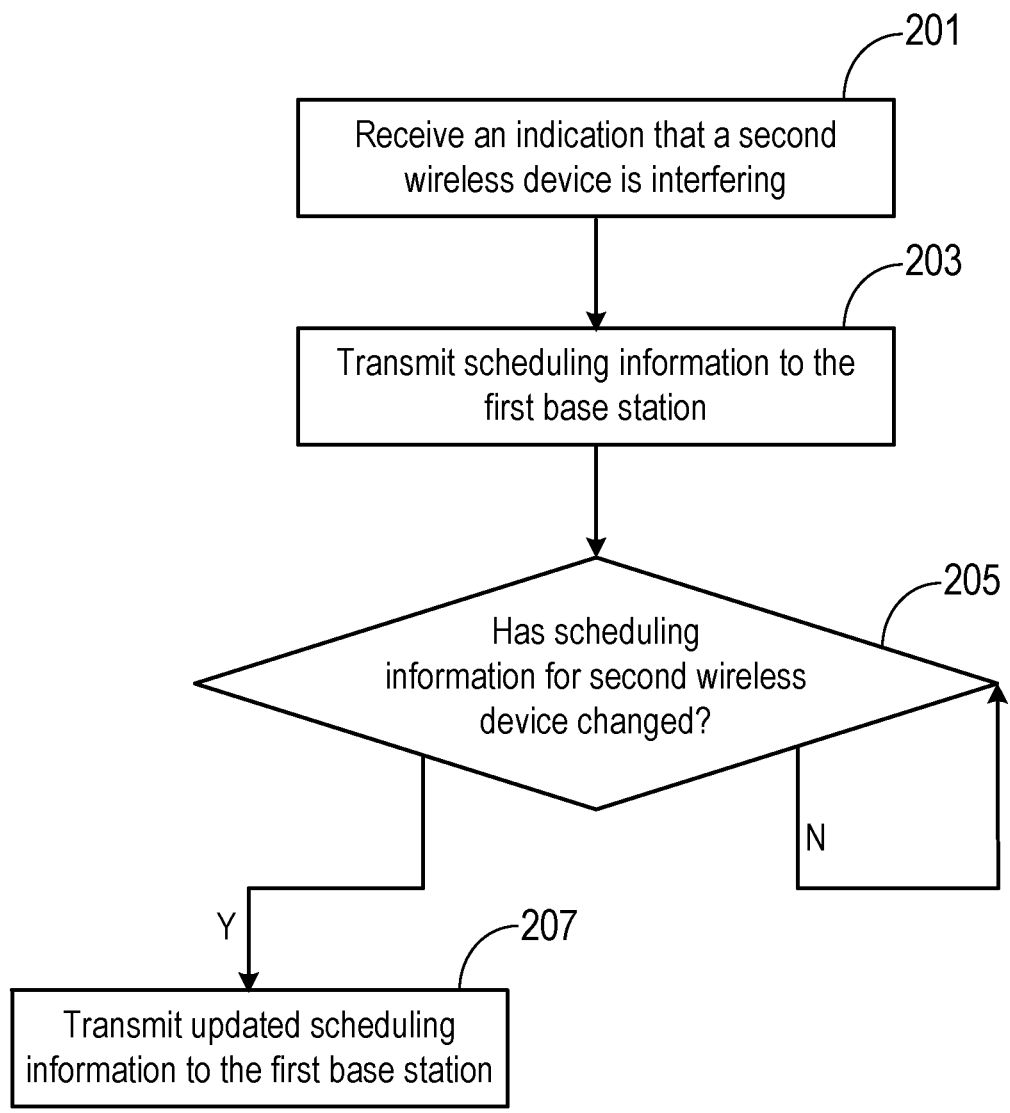
FIG. 2 illustrates a method of providing scheduling information for use in a channel estimation of a first wireless channel between a first wireless device and a first base station.

For example, the second base station 109 may be configured to perform a method such as the method described in FIG. 2.

FIG. 2 illustrates a method of providing scheduling information for use in a channel estimation of a first wireless channel between a first wireless device and a first base station. The method may be performed by a second base station, for example network node 860 described later with reference to FIG. 8.

In step 201, the second base station 109 receives an indication that the second wireless device 107 will interfere with communications between the first wireless device 103 and the first base station 101. It will be appreciated that the indication may be determined in any suitable manner, for example, the indication may be determined based on measurements made by the second wireless device 107 and reported to the second base station 109, or based on an indication received from another node in the network.

In some embodiments, the indication may comprise a signal received from the second wireless device 107 related to a measured signal metric of transmissions received at the second wireless device 107 from the first base station 101. For example, such an indication may be transmitted to the second base station 109 as part of an LTE A3 event, for example during a handover procedure. For example, the measured signal metric of transmissions received at the second wireless device 107 from the first base station 101 may comprise a measurement of the Reference Signal Received Power (RSRP) or Reference Signal Received Quality (RSRQ) received at the second wireless device 107 from the first base station 101.

In other words, the second base station 109 may receive the indication from the second wireless device 107. In some embodiments, the second base station compares the indication to a threshold to determine whether or not the second wireless device 107 will interfere with communications between the first wireless device 103 and the first base station 101. For example, if the reported RSRP or RSRQ is above a certain threshold, this may be indicative of the second wireless device 107 being relatively close to the first base station 101, and therefore more likely to interfere with the communications between the first wireless device 103 and the first base station 101.

The indication may in some embodiments be transmitted to the second base station 109 as part of an LTE A3 event, which is triggered when a neighbouring cell becomes better than the serving cell by an offset. For example, a measured metric associated with the neighbouring cell may be compared to a threshold, or compared to an equivalent metric associated with the serving cell. The measured metric may be for example the received power, or received signal quality. The indication may in some embodiments be transmitted as part of an LTE A5 event, which is triggered when a metric associated with the serving cell becomes worse than a first threshold whilst an equivalent metric associated with a neighbouring cell becomes better than a second threshold, for example the wireless device may be moving away from the serving cell, or a 3G Ic event, which is triggered when a measurement of a non-active primary Common Pilot Channel (CPICH) becomes better than an equivalent measurement of an active primary CPICH. All of these events may indicate that the second wireless device 109 is likely to interfere with the communication between the first base station 101 and the first wireless device 103.

In some examples, the indication may comprise reported measurements related to the communications received at the second wireless device 107 from the first base station 101, for example, the reported pathloss, and/or the Signal-to-Interference-plus-Noise Ratio (SINR).

Returning to FIG. 2, in step 203, the second base station 109 transmits scheduling information to the first base station 101. In some embodiments, this may be performed in response to receiving the indication that the second wireless device 107 will interfere with communications between the first wireless device 103 and the first base station 101.

In some examples, the second wireless device 107 may identify the first base station 101 from the received indication. In other words, the indication may indicate the cell identity of the cell served by the first base station 101.

In some examples, the scheduling information is transmitted by the second base station 109 to the first base station 101 directly (e.g. using an X2 interface). In other examples, the scheduling information may be transmitted by the second base station 109 to the first base station 101 indirectly (e.g. via the S1 interface with the core network). In some examples, the scheduling information is transmitted to the first base station 101 before the second wireless device 107 is scheduled to transmit the second reference signal. In some examples, the scheduling information is transmitted to the first base station 101 at least 5 ms in advance of the second reference signal being transmitted by the second wireless device 107. This may compensate for latency in the interface between the first base station 101 and the second base station 109. Therefore, embodiments disclosed herein may not be sensitive to high-latency and low-bandwidth backhaul-links (for example an X2 interface) between base stations.

The scheduling information may comprise scheduling information according to which the second wireless device 107 is scheduled to transmit a second reference signal $DM\_RS_2$ to the second base station 109. For example, the scheduling information may comprise information suitable for generating a constructed reference signal representative of the second reference signal.

In other words, the scheduling information may comprise enough information to allow the first base station 101 to generate a constructed reference signal equivalent to what will be transmitted by the second wireless device 107 to the second base station 109. For example, the scheduling information may allow the first base station 101 to determine what information is scheduled to be transmitted in the second reference signal, and which resources will be used to transmit the second reference signal. For example, the scheduling information may comprise a physical cell identification of the second base station 109, a radio network temporary identifier (RNTI) for a cell served by the second base station 109, an allocation of physical resource blocks to the second wireless device for use in transmitting the second reference signal, a frame number and/or a subframe number for use in transmitting the second reference signal and/or a periodicity with which the second wireless device 107 will transmit the second reference signal.

In step 205, the second base station 109 checks to see if the scheduling information for the second wireless device 107 has changed. In other words, the second base station 109 determines whether the second wireless device 107 will be transmitting a different $DM\_RS_2$, or transmitting the $DM\_RS_2$ using different resources. If the scheduling information for the second wireless device 107 has changed, the method passes to step 207 in which the second base station 109 transmits updated scheduling information to the first base station 101. If the scheduling information has not changed, the second base station 109 continues to check whether the scheduling information for the second wireless device 107 changes in step 205.

Returning to FIG. 1, the first base station 101 is configured to receive scheduling information 105 from the second base station 109. The first base station 101 may in some embodiments be configured to perform the method as described in FIG. 3.

Figure 3:
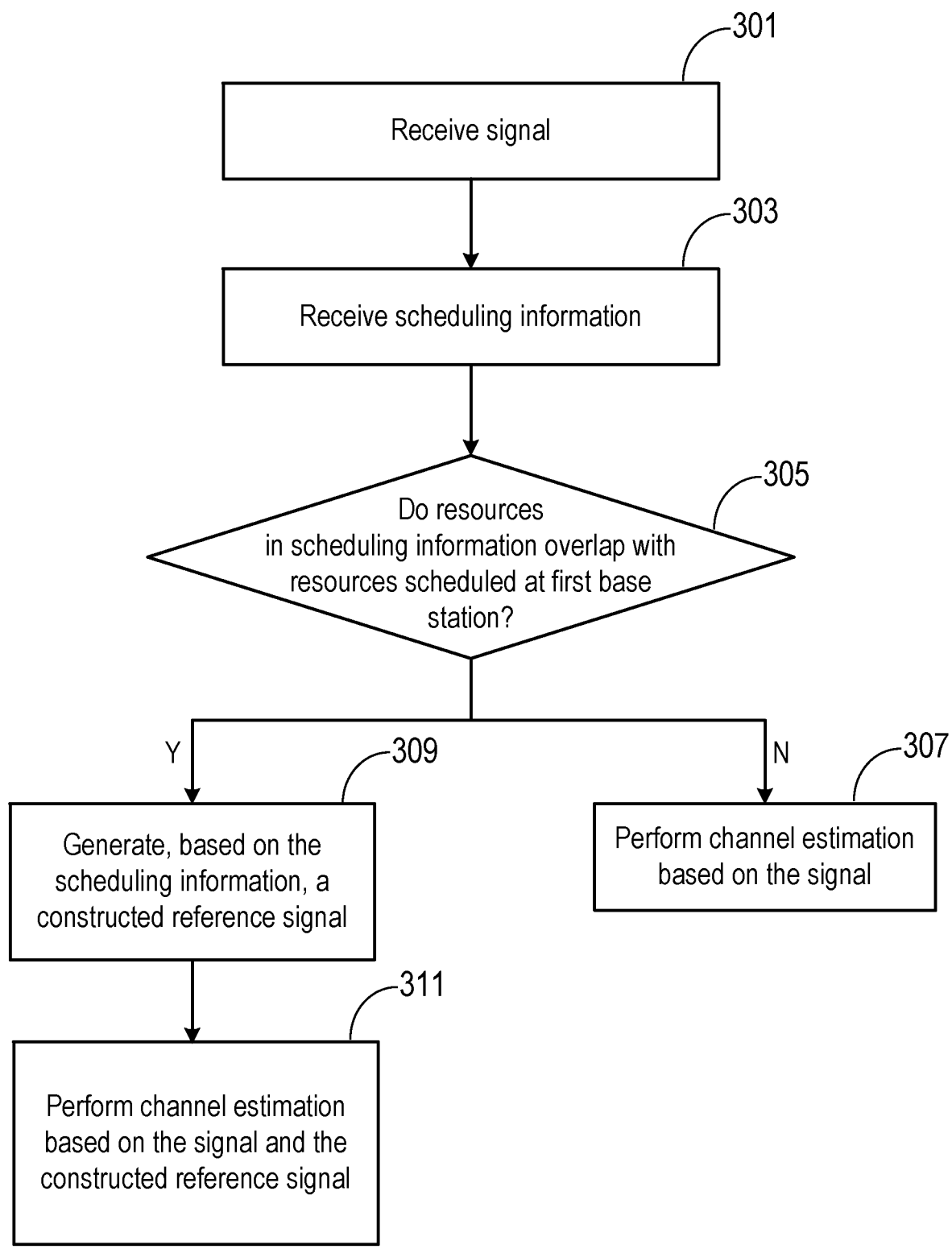
FIG. 3 illustrates a method in a network node for performing channel estimation.

FIG. 3 illustrates a method of performing channel estimation of a first wireless channel 102 between a first wireless device 103 and the first base station 101. The method may be performed by a base station, for example network node 860 described later with reference to FIG. 8.

In step 301, the first base station 101 receives a signal 115 comprising a first component received over the first wireless channel 102, the first component corresponding to a first reference signal $DM\_RS_1$ transmitted by the first wireless device 103 to the first base station 101. In some examples, the signal 115 further comprises a second component, wherein at least part of the second component corresponds to a second reference signal $DM\_RS_2$ transmitted by a second wireless device to a second base station. In other words, at least a part of the signal 115 corresponds to a second reference signal $DM\_RS_2$ which is received over a second wireless channel 104 between the second wireless device 107 and the first base station 101.

The second component of the signal 115 may correspond to one or more interfering second reference signals transmitted by one or more second wireless devices.

The first component of the signal 115 corresponds to the first reference signal being received over the first wireless channel 102. The part of the second component which corresponds to the second reference signal is received due to the second reference signal being received over a second wireless channel 104 between the second wireless device 107 and the first base station 101.

In some embodiments, the second component corresponds to a plurality of second reference signals transmitted by a plurality of devices in neighbouring cells. It will be appreciated that there may be more than one wireless device, either served by the second base station 107, or by another neighbouring base station to the first base station 101, which is potentially interfering with the communications between the first base station 101 and the first wireless device 103. The first base station 101 may therefore receive a second reference signal from each second wireless device, wherein each second reference signal is received over a different second wireless channel 104.

In step 303, the first base station 101 receives scheduling information according to which the second wireless device 107 is scheduled to transmit the second reference signal to the second base station 109. It will be appreciated that the second base station 109 may be configured as described with reference to FIG. 2. The received scheduling information may comprise information relating to a number, N, of second wireless devices in neighbouring cells. It will be appreciated that the scheduling information may be received from a number, M, of different neighbouring base stations where each neighbouring base station may be serving one or more second wireless devices.

In some embodiments, the second wireless devices N are each served by a respective different second base station, i.e. N=M. In other embodiments, some of the second wireless devices may be served by the same second base station, i.e. N≠M. In other embodiments, a second wireless device may be performing a soft handover between two second base stations. In this example, the scheduling information relating to the second wireless device may be transmitted by both the base station which the second wireless device is currently connected to, and the base station which the second wireless device is handing over to.

In step 305, the first base station 101 may be configured to determine whether radio resources scheduled for use by the second wireless device 107 to transmit the second reference signal at least partially overlap with radio resources scheduled for use by the first wireless device 103 to transmit the first reference signal. In other words, the first base station 101 determines whether the received scheduling information relates to any wireless devices that are scheduled to use radio resources which are scheduled for use by a wireless device communicating with the first base station 101 for transmitting a reference signal.

For example, the first base station 101 may determine whether the physical resource blocks scheduled for use in the received scheduling information are the same as any of the physical resources blocks scheduled for use by any of the wireless devices served by the first base station 101 for transmitting a reference signal.

If the first base station 101 determines that there is no overlap between the radio resources scheduled for use in the scheduling information and the radio resources scheduled for use by the first wireless device 103 to transmit the first reference signal, the method passes to step 307 in which the first base station 101 performs channel estimation based on the signal 115 and the first reference signal. In this example, as the first base station has determined that the resources being used to transmit reference signals by the wireless devices that first base station is serving are not the same as resources are being used by the neighbouring wireless devices referred to in the scheduling information, the first base station may determine that there is no second component of the signal, as indicated in the received scheduling information. Therefore, as in this example, the signal 115 may only comprise a first component corresponding to the first reference signal, the channel estimation may be performed by cross-correlating the first reference signal, which the first base station 101 can generate based on the scheduling information for the first wireless device 103, with the signal 115.

If, in step 305, the first base station determines that the radio resources scheduled for use by the second wireless device to transmit the second reference signal at least partially overlap with the radio resources scheduled for use by the first wireless device to transmit the first reference signal, the method passes to step 309.

For example, the first base station 101 may determine that at least one physical resource block (PRB) scheduled for use by the second wireless device to transmit the second reference signal is the same as a PRB scheduled for use by the first wireless device to transmit the first reference signal.

In step 309, the first base station generates, based on the scheduling information, a constructed reference signal representative of the second reference signal. In other words, the first base station receives the scheduling information and may determine from the scheduling information what the second reference signal to be transmitted by the second wireless device will be.

For example, the first base station may generate the constructed reference signal by following a standardised method for determining the reference signal to be transmitted by a wireless device to a base station. For example, the first base station may generate the constructed reference signal as described in the 3GPP standardization document TS 36.211 version 13.0.0 (see section 5.5.2 entitled "Demodulation Reference Signals"), using the scheduling information received from the second base station.

The method then passes to step 311 in which the first base station then performs the channel estimation of the first wireless channel 102 based on the signal 115 and the constructed reference signal.

For example, as the first base station has determined that the radio resources scheduled for use by the second wireless device to transmit the second reference signal at least partially overlap with the radio resources scheduled for use by the first wireless device in transmitting the first reference signal, it is likely that the signal comprises a second component, wherein at least part of the second component corresponds to the second reference signal. Therefore, in order to provide an accurate channel estimation, the second component of the signal may be accounted for during the channel estimation.

In some embodiments, the step of performing the channel estimation may be described with reference to FIG. 4.

Figure 4:
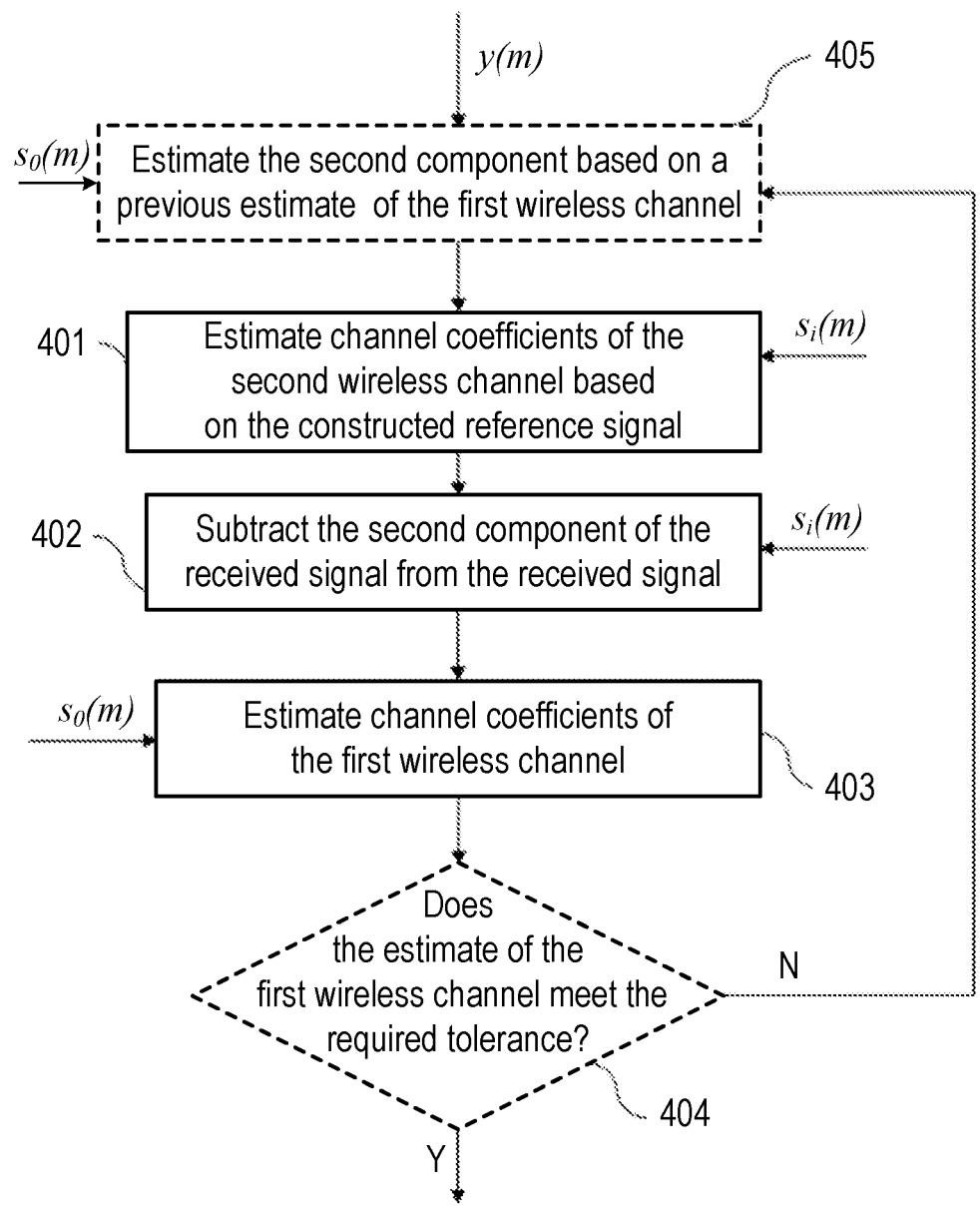
FIG. 4 illustrates a method of performing channel estimation according to some embodiments.

FIG. 4 illustrates a method of performing channel estimation according to some embodiments.

In this example, the signal 115 received at the first base station can be represented by the following equation:

$$y(m) = h_0 s_0(m) + \sum_{i=1}^{N} h_i s_i(m) \quad (1)$$

where, for a particular subcarrier m, $h_0 s_0(m)$ is the first component of the signal 115 corresponding to the first reference signal $s_0(m)$, $h_0$ represents channel coefficients describing the first wireless channel 102 between the first wireless device and the first base station, and y(m) is representative of a Fast Fourier Transform (FFT) of the signal 115, i.e. the received signal of a subcarrier in the frequency domain. The second component of the signal 115 is represented by the term $$\sum_{i=1}^{N} h_i s_i(m)$$

which corresponds to a second reference signal $s_i(m)$ transmitted by a second wireless device over a second channel between the second wireless device and the first base station. As explained above, the second reference signal $s_i(m)$ may be represented by a constructed reference signal generated by the first base station. The term $h_i$ represents a channel coefficients describing the second wireless channel between the second wireless device i and the first base station.

In this example, the second component corresponds to N second reference signals transmitted by N wireless devices over N different channels, where N is an integer number.

The illustrated method is an iterative method, starting from step 401. It will be appreciated that in some embodiments, only the steps 401 to 403 will be performed. However, in some embodiments the steps 404 and 405 will also be performed, before repeating the steps 401 to 403 using a different input for step 401, as will be explained in more detail below.

For the first iteration, in step 401 the first base station 101 estimates a channel estimate $\hat{h}_i$ of the second wireless channel between the second wireless device and the first base station. To estimate the second wireless channel, the first base station may be configured to cross-correlate the constructed reference signal $\hat{s}_i(m)$ with the signal y(m).

The components of the signal y(m) which correlate the constructed reference signal can be used to indicate which components of the signal were received due to the transmission of the reference signal which is represented by the constructed reference signal. For example, if the first reference signal and second reference signal(s) are completely de-correlated, then performing a cross-correlation of the signal y(m) with the constructed reference signal(s)) $s_i(m)$ may be used to estimate the second component of the signal y(m).

In some examples, the first reference signal, for example $DM\_RS_1$, and the second reference signal, for example $DM\text{-}RS_2$, may not be completely de-correlated. For example, Doppler effects due to mobility and channel dynamics may contribute to reducing the level of the decorrelation between the first reference signal and the second reference signal(s).

However, by cross-correlating the constructed reference signal $s_i(m)$ with the signal y(m), an estimate of the second component of the signal may be obtained. Then, by subtracting this estimate of the second component from the signal y(m) to obtain an estimate of the first component of the received signal, and cross-correlating the first reference signal with the estimated first component of the received signal, a more accurate estimate of the first wireless channel may be obtained.

The channel estimate $\hat{h}_i$ of the second wireless channel may therefore be estimated as:

$$\hat{h}_i = \frac{1}{K} \sum_{m=0}^{K-1} y(m) s_i^*(m), \quad (2)$$

where $\hat{h}_i$ is the estimation of the second wireless channel between the second wireless device i and the first base station, K is the number of subcarriers, y(m) is the signal received by the first base station and $s^*_i(m)$ is the complex conjugate of the constructed reference signal for the second wireless device i. This channel estimation may be repeated for every second wireless device i that the received scheduling information relates to. In other words, for an example in which the scheduling information relates to N second wireless devices, the method comprises estimating each of the N second wireless channels separately. For example, the channel coefficients $\hat{h}_1, \hat{h}_2 \ldots \hat{h}_N$ may be calculated using the constructed reference signals $s_1(m), s_2(m) \ldots s_N(m)$ for each wireless device with the index i=1, 2 . . . N.

In step 402, the first base station 101 may then estimate the second component of the signal and remove the second component of the signal from the received signal. In some examples, therefore the first base station may then multiply the channel estimation $\hat{h}_i$ with the constructed reference signal $s_i(m)$ to obtain an estimate of the second component of the signal, $\hat{y}_2(m)$. In some examples, the estimate of the second component of the signal may comprise a sum of each of the respective channel estimates multiplied with the respective constructed reference signals for the N second wireless devices. For example, the second component $\hat{y}_2(m)$ may be estimated as:

$$\hat{y}_2(m) = \sum_{i=1}^{N} \hat{h}_i s_i(m). \quad (3)$$

The first base station may then estimate the first component of the signal by subtracting the estimate of the second component, $\hat{y}_2(m)$ of the signal from the received signal, y(m), i.e.:

$$\hat{y}_1(m)=y(m)-\hat{y}_2(m). \quad (4)$$

In step 403, the first base station estimates the first wireless channel based on the estimated first component of the signal $\hat{y}_1(m)$.

In some examples, the channel coefficients describing the first wireless channel may be estimated by cross-correlating the first reference signal $s_0(m)$ with the estimated first component of the signal $\hat{y}_1(m)$. In other words, the channel coefficients $\hat{h}_0$ of the first wireless channel may be estimated as:

$$\hat{h}_0 = \frac{1}{K}\sum_{m=0}^{K-1}\hat{y}_1(m)s_0^*(m), \quad (5)$$

where $s^*_0(m)$ is the complex conjugate of the first reference signal $s_0(m)$ and the cross-correlation is averaged over the number of subcarriers K.

As described previously, in some embodiments, the method terminates here, and the estimate of the first wireless channel $\hat{h}_0$ may be input into an interference mitigation algorithm, for example IRC, for providing interference suppression for communications between the first wireless device and the first base station.

In some embodiments, the method passes to step 404 in which the base station determines whether the estimate of the first wireless channel $\hat{h}_0$ meets a required tolerance.

For example, the method may comprise determining whether an iteration number is less than a minimum iteration number. The iteration number may be a count of how many times the method has passed through step 405. If the iteration number is less that the minimum iteration number, the estimate of the first wireless channel may not meet the required tolerance.

In some examples the estimate of the first wireless channel $\hat{h}_0$ meets the required tolerance if a difference between the estimate of the first wireless channel $\hat{h}_0$ and a previous estimate of the first wireless channel $\hat{h}_0$ is smaller than a threshold value.

In some examples, the estimate of the first wireless channel $\hat{h}_0$ meets the required tolerance if the iteration number reaches a maximum iteration number.

If, in step 404, the first base station determines that the estimate of the first wireless channel $\hat{h}_0$ meets the required tolerance, then the method terminates, and the estimate of the first wireless channel $\hat{h}_0$ may be output for use in an interference mitigation algorithm.

If, in step 404, the first base station determines that the estimate of the first wireless channel does not meet the required tolerance, then the method passes to step 405.

In step 405, the first base station determines a new estimate of the second component of the signal. In other words, in order to improve the estimate of the second wireless channel in step 401, the base station estimates the second component of the signal based on the previous estimate of the first wireless channel.

Step 405 may also comprise increasing the iteration number by one.

For example, the new estimate of the second component of the signal may be calculated as:

$$\hat{y}_2(m)=y(m)-\hat{h}_0s_0(m). \quad (6)$$

The method then passes to step 401, in which the new estimate of the second component of the signal may be cross-correlated with the constructed reference signal $s_i(m)$ to generate a new estimate of the second wireless channel.

As this cross-correlation is based on the estimate of the second component of the signal it may be more accurate than the cross-correlation with the full signal y(m) performed previously, as any undesirable correlation between the second reference signal and the first component may be reduced.

The method will then pass through steps 402 and 403 as previous described, to determine an updated estimate of the first wireless channel.

It will be appreciated that any number of iterations of the method may be performed. In some examples, the iterations of the method may continue until, at step 404, the first base station determines that the current estimate of the first wireless channel meets a required tolerance.

Figure 5:
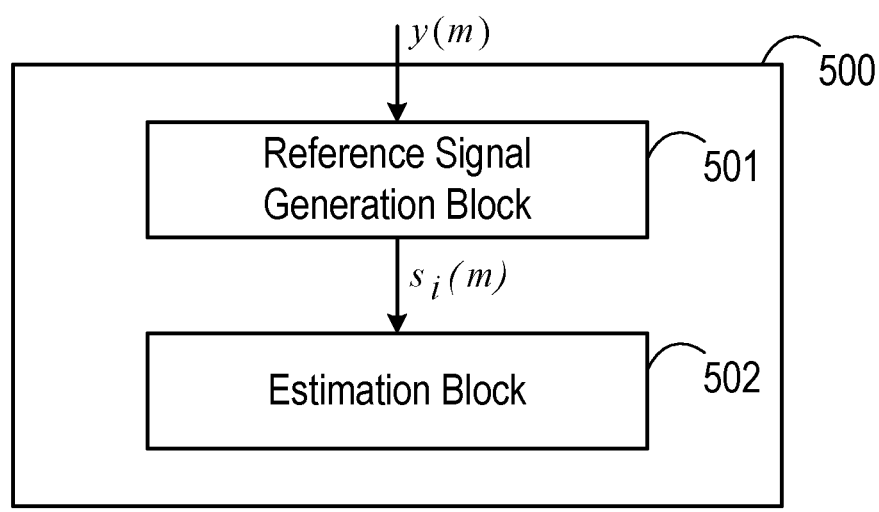
FIG. 5 illustrates a first base station comprising a channel estimation block according to some embodiments.

In some embodiments the first base station comprises a channel estimation block 500 as illustrated in FIG. 5.

In this example, the signal 115 received at the first base station can be represented by equation (1) above.

In this example, the scheduling information, received from the second base station, is input into a reference signal generation block 501. The reference signal generation block 501 generates the constructed reference signal $s_i(m)$ based on the scheduling information. As described above, the constructed reference signal $s_i(m)$ is representative of the reference signal scheduled for transmission from the second wireless device to the second base station.

In some examples, the scheduling information may comprise information relating to the scheduling of a plurality of second wireless devices, each of which may potentially be interfering with the communications between the first base station and the first wireless device. In this example, the reference signal generation block 501 may generate a constructed reference signal $s_i(m)$ for each second wireless device the scheduling information relates to.

The constructed reference signal, or plurality of constructed reference signals, $s_i(m)$ is then input into an estimation block 502. The estimation block 502 is configured to estimate the first wireless channel between the first wireless device and the first base station, as described above with reference to FIG. 4.

As described above with reference to FIG. 4, the channel estimation block 500 may be configured to iteratively calculate updated estimates of the first wireless channel.

Figure 6:
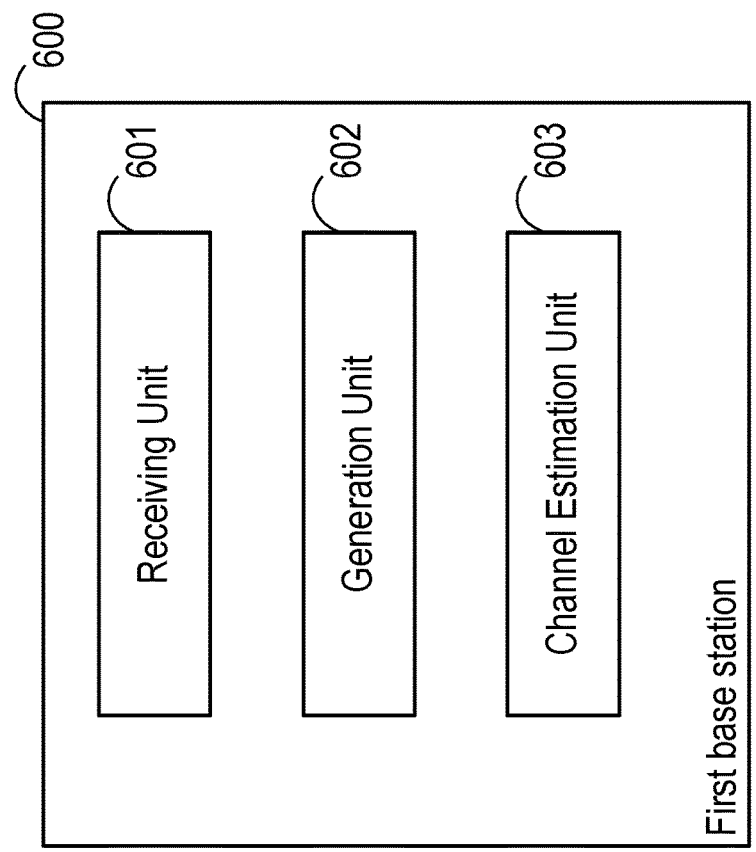
FIG. 6 illustrates a first base station according to some embodiments.

FIG. 6 illustrates a first base station according to some embodiments. The first base station 600 comprises a receiving unit 601 configured to receive a signal comprising a first component received over the first wireless channel, the first component corresponding to a first reference signal transmitted by the first wireless device to the first base station, and a second component, wherein at least part of the second component corresponds to a second reference signal transmitted by a second wireless device to a second base station. The receiving unit 601 is further configured to receive scheduling information according to which the second wireless device is scheduled to transmit the second reference signal to the second base station.

The first base station 600 further comprises a generation unit 602 configured to generate, based on the scheduling information, a constructed reference signal representative of the second reference signal. The first base station 600 further comprises a channel estimation unit 603 configured to perform channel estimation of the first wireless channel between the first wireless device and the first base station based on the signal and the constructed reference signal.

Figure 7:
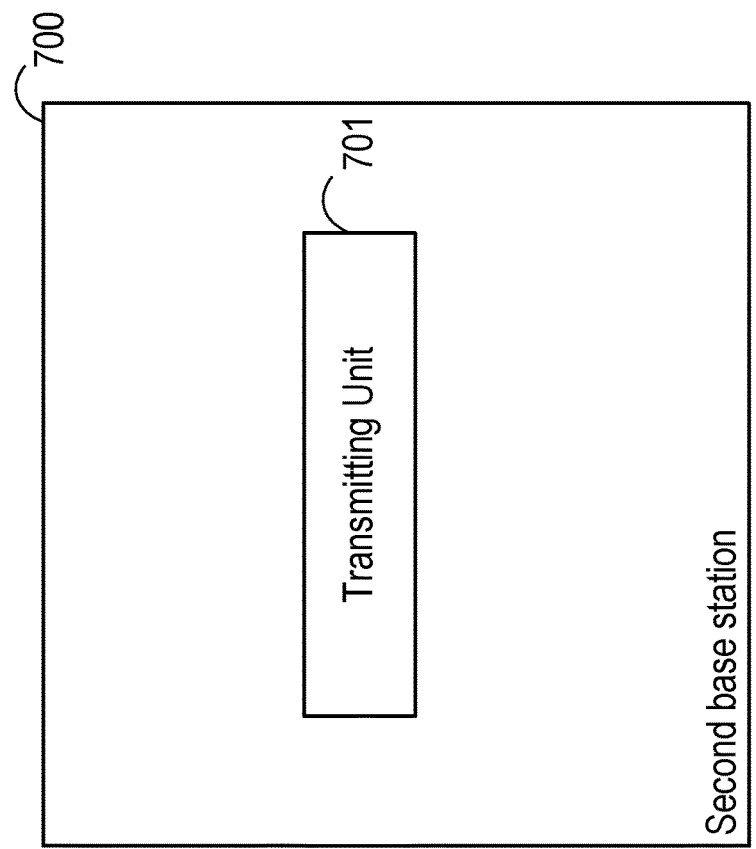
FIG. 7 illustrates a second base station according to some embodiments.

FIG. 7 illustrates a second base station 700 according to some embodiments. The second base station 700 comprises a transmitting unit 701 wherein the transmitting unit 701 is configured to: in response to an indication that a second wireless device communicating with the second base station will interfere with communications between the first wireless device and the first base station, transmit to the first base station the scheduling information according to which the second wireless device is scheduled to transmit a second reference signal to the second base station.

Figure 8:
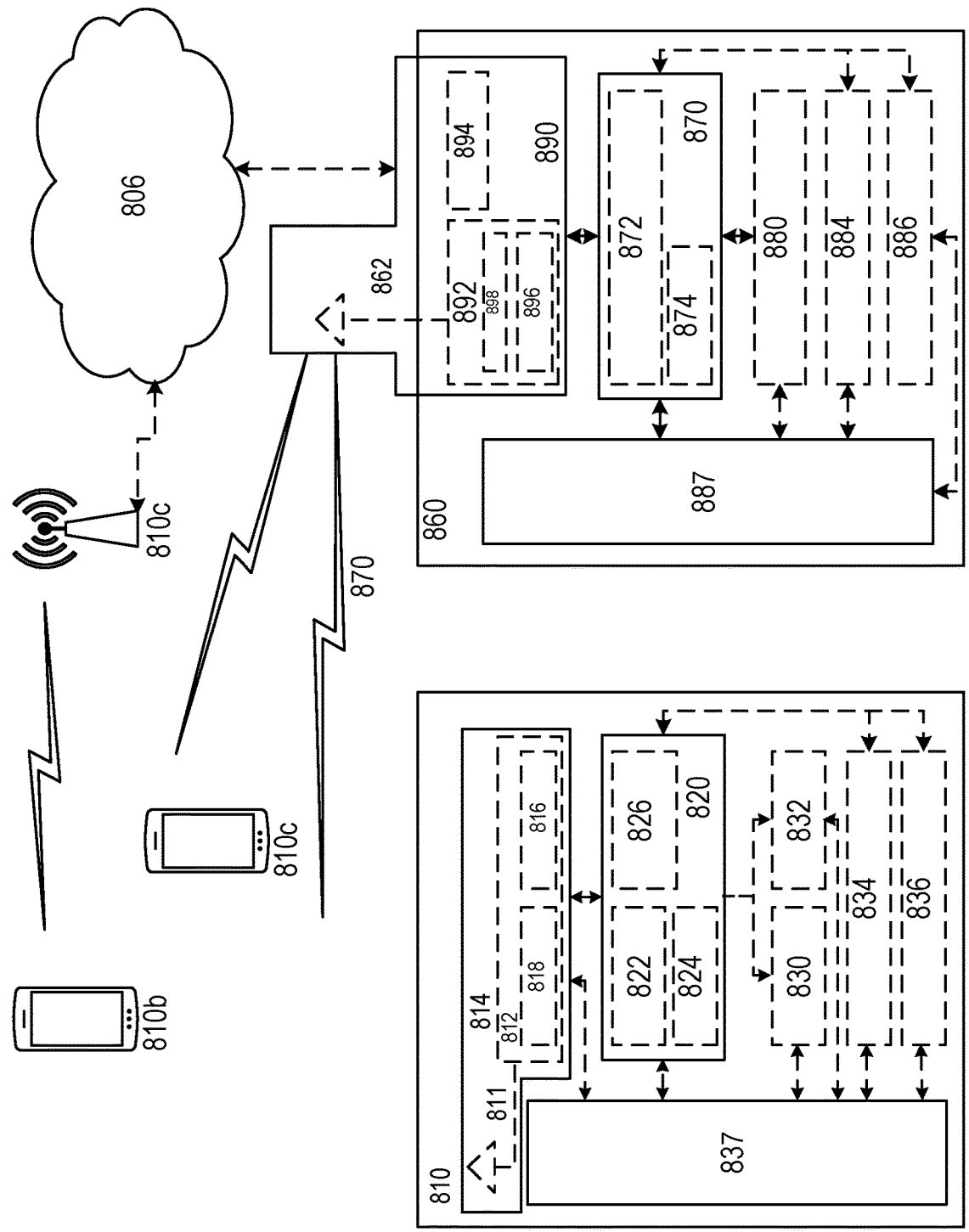
FIG. 8 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network may further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, WiFi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signalling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or WDs via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 may include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies may be integrated into the same or different chips or set of chips as other components within WD 810.

Antenna 811 may include one or more antennas or antenna arrays, configured to send and/or receive wireless signals, and is connected to interface 814. In certain alternative embodiments, antenna 811 may be separate from WD 810 and be connectable to WD 810 through an interface or port. Antenna 811, interface 814, and/or processing circuitry 820 may be configured to perform any receiving or transmitting operations described herein as being performed by a WD. Any information, data and/or signals may be received from a network node and/or another WD. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820, and is configured to condition signals communicated between antenna 811 and processing circuitry 820. Radio front end circuitry 812 may be coupled to or a part of antenna 811. In some embodiments, WD 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or WDs via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 810 components, such as device readable medium 830, WD 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of WD 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a WD may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 may be configured to perform any determining, calculating, or similar operations (e.g., certain obtaining operations) described herein as being performed by a WD. These operations, as performed by processing circuitry 820, may include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with WD 810. Such interaction may be of many forms, such as visual, audial, tactile, etc. User interface equipment 832 may be operable to produce output to the user and to allow the user to provide input to WD 810. The type of interaction may vary depending on the type of user interface equipment 832 installed in WD 810. For example, if WD 810 is a smart phone, the interaction may be via a touch screen; if WD 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into WD 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from WD 810, and to allow processing circuitry 820 to output information from WD 810. User interface equipment 832 may include, for example, a speaker, a display, vibrating circuitry, a USB port, a headphone interface, or other output circuitry. Using one or more input and output interfaces, devices, and circuits, of user interface equipment 832, WD 810 may communicate with end users and/or the wireless network, and allow them to benefit from the functionality described herein.

Auxiliary equipment 834 is operable to provide more specific functionality which may not be generally performed by WDs. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. WD 810 may further comprise power circuitry 837 for delivering power from power source 836 to the various parts of WD 810 which need power from power source 836 to carry out any functionality described or indicated herein. Power circuitry 837 may in certain embodiments comprise power management circuitry. Power circuitry 837 may additionally or alternatively be operable to receive power from an external power source; in which case WD 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of WD 810 to which power is supplied.

Figure 9:
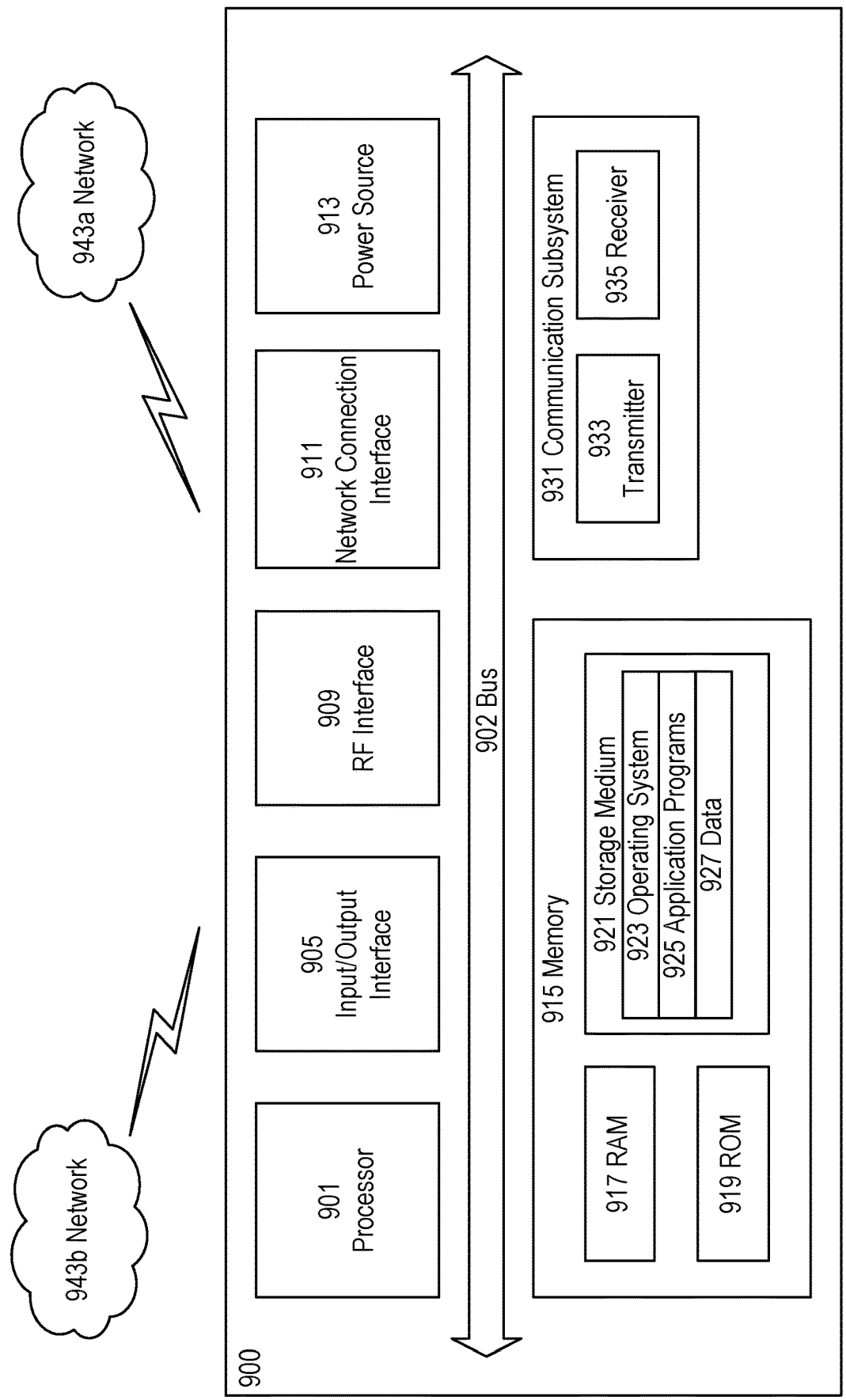
FIG. 9 illustrates a User Equipment in accordance with some embodiments.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 9200 may be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943*b* using communication subsystem 931. Network 943*a* and network 943*b* may be the same network or networks or different network or networks. Communication subsystem 931 may be configured to include one or more transceivers used to communicate with network 943*b*. For example, communication subsystem 931 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943*b* may encompass wired and/or wireless networks such as a local-area network (LAN), a wide-area network (WAN), a computer network, a wireless network, a telecommunications network, another like network or any combination thereof. For example, network 943*b* may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Figure 10:
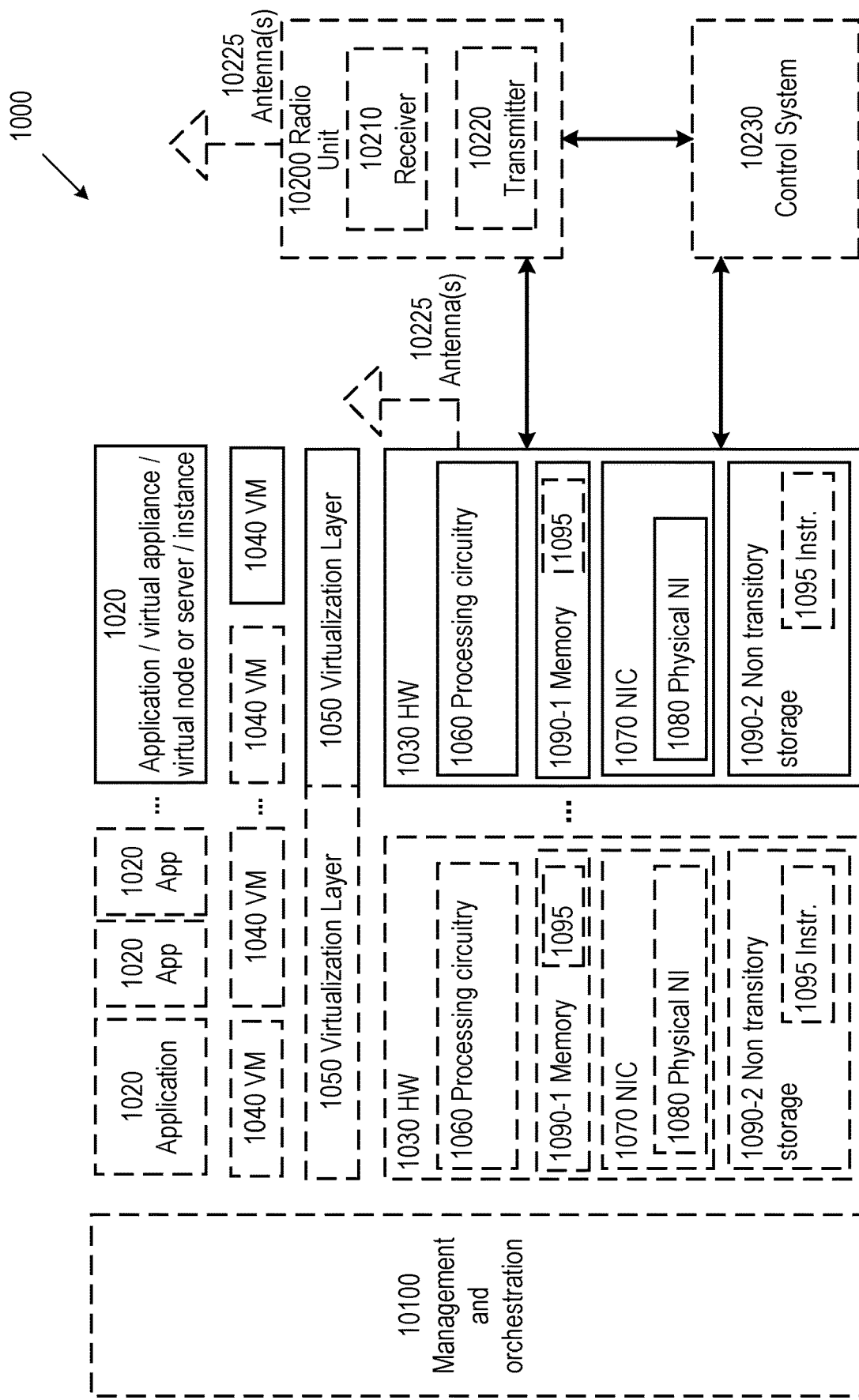
FIG. 10 illustrates a virtualization environment in accordance with some embodiments.

FIG. 10 is a schematic block diagram illustrating a virtualization environment 1000 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node may be entirely virtualized.

The functions may be implemented by one or more applications 1020 (which may alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000, comprises general-purpose or special-purpose network hardware devices 1030 comprising a set of one or more processors or processing circuitry 1060, which may be commercial off-the-shelf (COTS) processors, dedicated Application Specific Integrated Circuits (ASICs), or any other type of processing circuitry including digital or analog hardware components or special purpose processors. Each hardware device may comprise memory 1090-1 which may be non-persistent memory for temporarily storing instructions 1095 or software executed by processing circuitry 1060. Each hardware device may comprise one or more network interface controllers (NICs) 1070, also known as network interface cards, which include physical network interface 1080. Each hardware device may also include non-transitory, persistent, machine-readable storage media 1090-2 having stored therein software 1095 and/or instructions executable by processing circuitry 1060. Software 1095 may include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and may be run by a corresponding virtualization layer 1050 or hypervisor. Different embodiments of the instance of virtual appliance 1020 may be implemented on one or more of virtual machines 1040, and the implementations may be made in different ways.

During operation, processing circuitry 1060 executes software 1095 to instantiate the hypervisor or virtualization layer 1050, which may sometimes be referred to as a virtual machine monitor (VMM). Virtualization layer 1050 may present a virtual operating platform that appears like networking hardware to virtual machine 1040.

As shown in FIG. 10, hardware 1030 may be a standalone network node with generic or specific components. Hardware 1030 may comprise antenna 10225 and may implement some functions via virtualization. Alternatively, hardware 1030 may be part of a larger cluster of hardware (e.g. such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1040 may be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 may be coupled to one or more antennas 10225. Radio units 10200 may communicate directly with hardware nodes 1030 via one or more appropriate network interfaces and may be used in combination with the virtual components to provide a virtual node with radio capabilities, such as a radio access node or a base station.

In some embodiments, some signalling can be effected with the use of control system 10230 which may alternatively be used for communication between the hardware nodes 1030 and radio units 10200.

Figure 11:
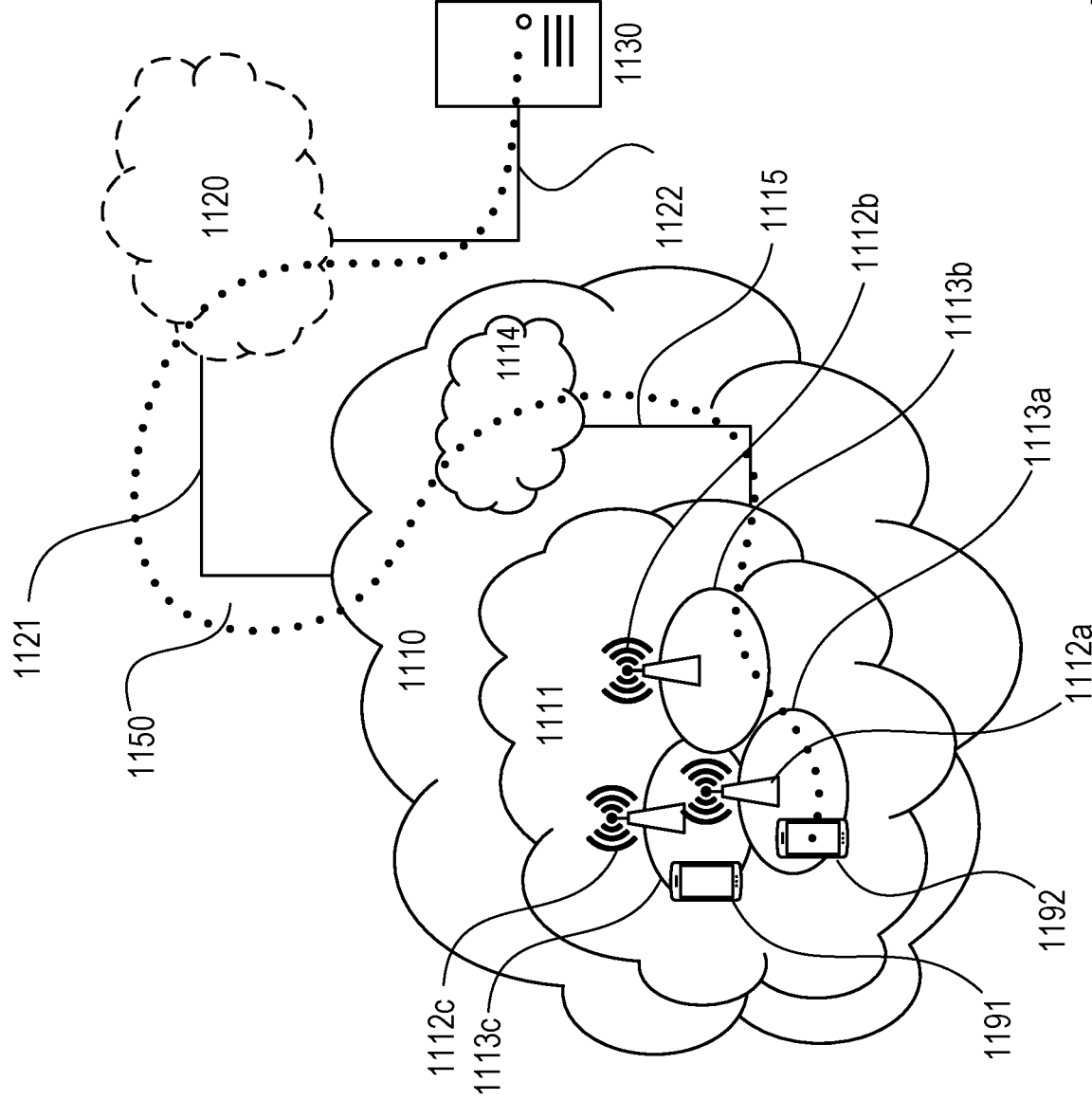
FIG. 11 illustrates a telecommunication network connected via an intermediate network to a host computer in accordance with some embodiments.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c is configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the corresponding base station 1112.

Telecommunication network 1110 is itself connected to host computer 1130, which may be embodied in the hardware and/or software of a standalone server, a cloud-implemented server, a distributed server or as processing resources in a server farm. Host computer 1130 may be under the ownership or control of a service provider, or may be operated by the service provider or on behalf of the service provider. Connections 1121 and 1122 between telecommunication network 1110 and host computer 1130 may extend directly from core network 1114 to host computer 1130 or may go via an optional intermediate network 1120. Intermediate network 1120 may be one of, or a combination of more than one of, a public, private or hosted network; intermediate network 1120, if any, may be a backbone network or the Internet; in particular, intermediate network 1120 may comprise two or more sub-networks (not shown).

The communication system of FIG. 11 as a whole enables connectivity between the connected UEs 1191, 1192 and host computer 1130. The connectivity may be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 may be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which may have storage and/or processing capabilities. In particular, processing circuitry 1218 may comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 may be operable to provide a service to a remote user, such as UE 1230 connecting via OTT connection 1250 terminating at UE 1230 and host computer 1210. In providing the service to the remote user, host application 1212 may provide user data which is transmitted using OTT connection 1250.

Communication system 1200 further includes base station 1220 provided in a telecommunication system and comprising hardware 1225 enabling it to communicate with host computer 1210 and with UE 1230. Hardware 1225 may include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 may be configured to facilitate connection 1260 to host computer 1210. Connection 1260 may be direct or it may pass through a core network (not shown in FIG. 12) of the telecommunication system and/or through one or more intermediate networks outside the telecommunication system. In the embodiment shown, hardware 1225 of base station 1220 further includes processing circuitry 1228, which may comprise one or more programmable processors, application-specific integrated circuits, field programmable gate arrays or combinations of these (not shown) adapted to execute instructions. Base station 1220 further has software 1221 stored internally or accessible via an external connection.

Communication system 1200 further includes UE 1230 already referred to. Its hardware 1235 may include radio interface 1237 configured to set up and maintain wireless connection 1270 with a base station serving a coverage area in which UE 1230 is currently located. Hardware 1235 of UE 1230 further includes processing circuitry 1238, which may comprise one or more programmable processors, application-specific integrated circuits, field programmable gate arrays or combinations of these (not shown) adapted to execute instructions. UE 1230 further comprises software 1231, which is stored in or accessible by UE 1230 and executable by processing circuitry 1238. Software 1231 includes client application 1232. Client application 1232 may be operable to provide a service to a human or non-human user via UE 1230, with the support of host computer 1210. In host computer 1210, an executing host application 1212 may communicate with the executing client application 1232 via OTT connection 1250 terminating at UE 1230 and host computer 1210. In providing the service to the user, client application 1232 may receive request data from host application 1212 and provide user data in response to the request data. OTT connection 1250 may transfer both the request data and the user data. Client application 1232 may interact with the user to generate the user data that it provides.

Figure 12:
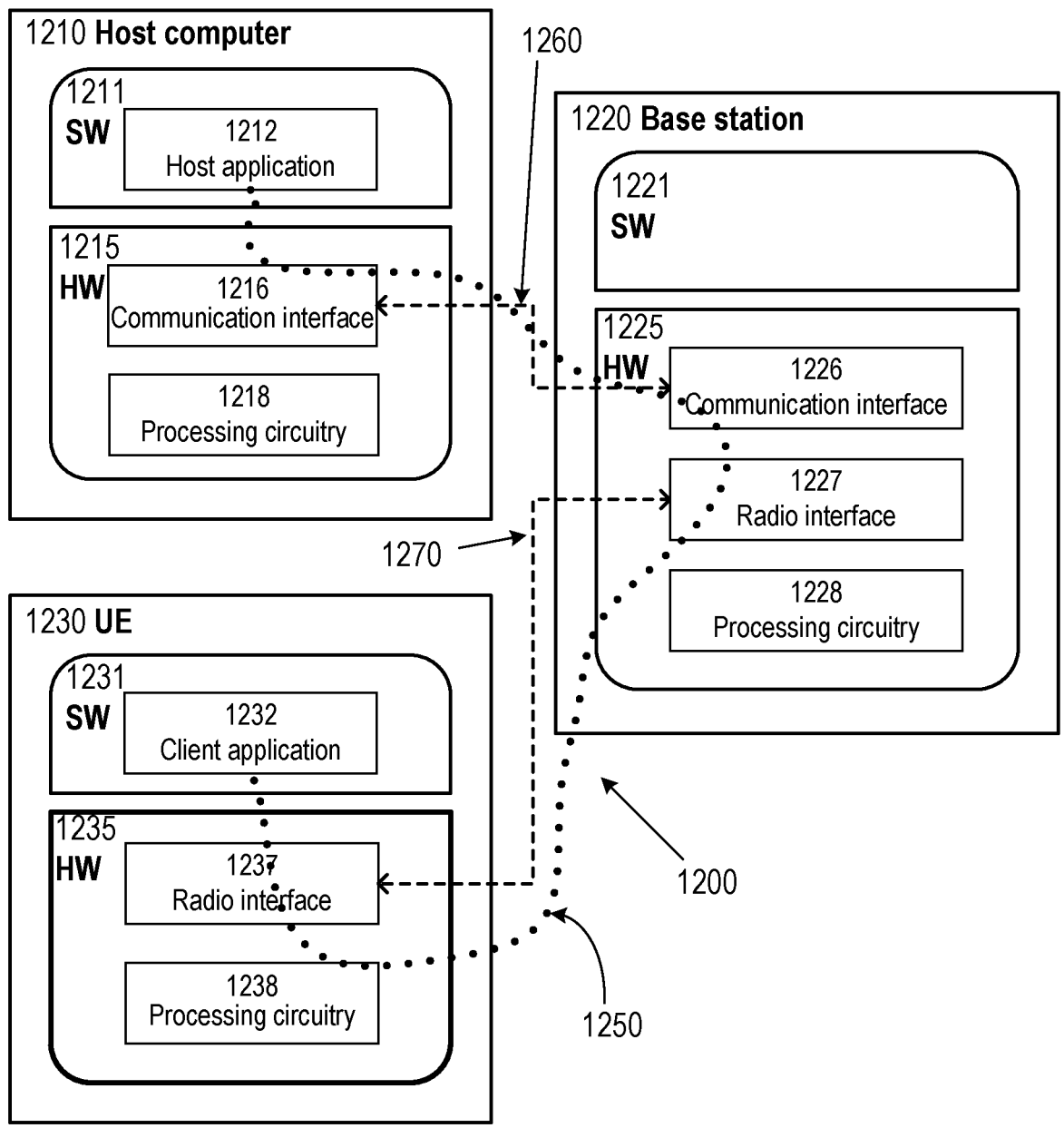
FIG. 12 illustrates a host computer communicating via a base station with a user equipment over a partially wireless connection in accordance with some embodiments.

It is noted that host computer 1210, base station 1220 and UE 1230 illustrated in FIG. 12 may be similar or identical to host computer 1130, one of base stations 1112a, 1112b, 1112c and one of UEs 1191, 1192 of FIG. 11, respectively. This is to say, the inner workings of these entities may be as shown in FIG. 12 and independently, the surrounding network topology may be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure may determine the routing, which it may be configured to hide from UE 1230 or from the service provider operating host computer 1210, or both. While OTT connection 1250 is active, the network infrastructure may further take decisions by which it dynamically changes the routing (e.g., on the basis of load balancing consideration or reconfiguration of the network).

Wireless connection 1270 between UE 1230 and base station 1220 is in accordance with the teachings of the embodiments described throughout this disclosure. One or more of the various embodiments improve the performance of OTT services provided to UE 1230 using OTT connection 1250, in which wireless connection 1270 forms the last segment. More precisely, the teachings of these embodiments may improve the channel estimations of the channels between wireless devices and thereby provide benefits such as reduced interference.

A measurement procedure may be provided for the purpose of monitoring data rate, latency and other factors on which the one or more embodiments improve. There may further be an optional network functionality for reconfiguring OTT connection 1250 between host computer 1210 and UE 1230, in response to variations in the measurement results. The measurement procedure and/or the network functionality for reconfiguring OTT connection 1250 may be implemented in software 1211 and hardware 1215 of host computer 1210 or in software 1231 and hardware 1235 of UE 1230, or both. In embodiments, sensors (not shown) may be deployed in or in association with communication devices through which OTT connection 1250 passes; the sensors may participate in the measurement procedure by supplying values of the monitored quantities exemplified above, or supplying values of other physical quantities from which software 1211, 1231 may compute or estimate the monitored quantities. The reconfiguring of OTT connection 1250 may include message format, retransmission settings, preferred routing etc.; the reconfiguring need not affect base station 1220, and it may be unknown or imperceptible to base station 1220. Such procedures and functionalities may be known and practiced in the art. In certain embodiments, measurements may involve proprietary UE signaling facilitating host computer 1210's measurements of throughput, propagation times, latency and the like. The measurements may be implemented in that software 1211 and 1231 causes messages to be transmitted, in particular empty or 'dummy' messages, using OTT connection 1250 while it monitors propagation times, errors etc.

Figure 13:
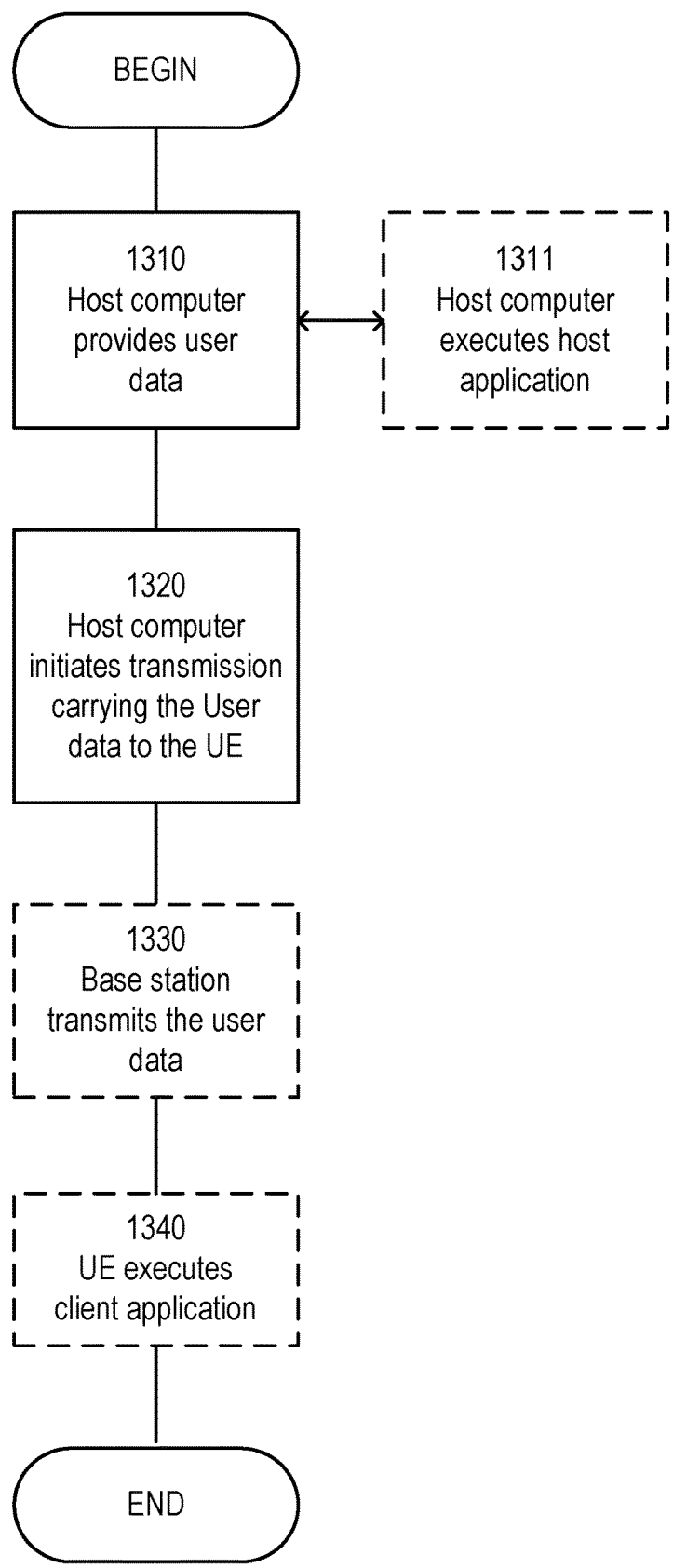
FIG. 13 illustrates methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 13 will be included in this section. In step 1310, the host computer provides user data. In substep 1311 (which may be optional) of step 1310, the host computer provides the user data by executing a host application. In step 1320, the host computer initiates a transmission carrying the user data to the UE. In step 1330 (which may be optional), the base station transmits to the UE the user data which was carried in the transmission that the host computer initiated, in accordance with the teachings of the embodiments described throughout this disclosure. In step 1340 (which may also be optional), the UE executes a client application associated with the host application executed by the host computer.

Figure 14:
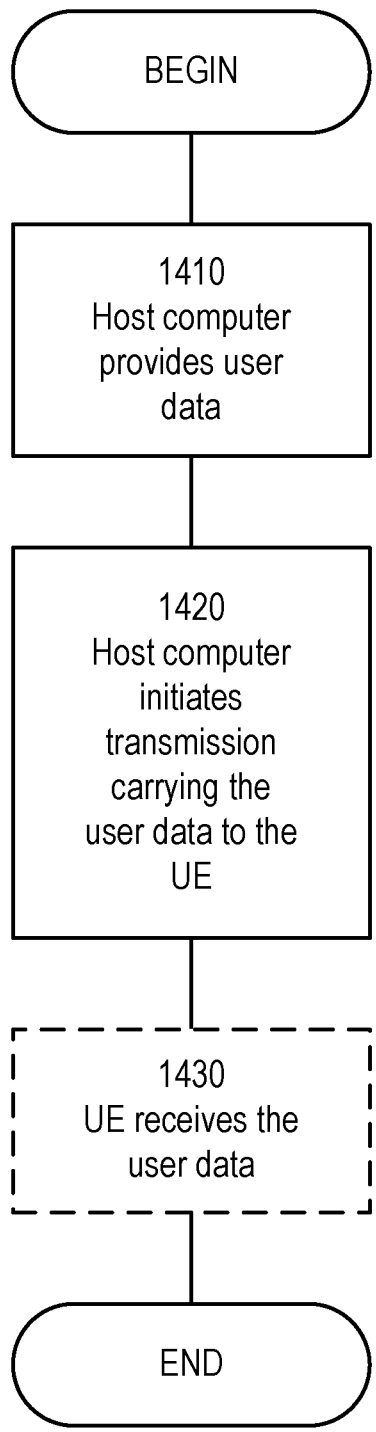
FIG. 14 illustrates methods implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission may pass via the base station, in accordance with the teachings of the embodiments described throughout this disclosure. In step 1430 (which may be optional), the UE receives the user data carried in the transmission.

Figure 15:
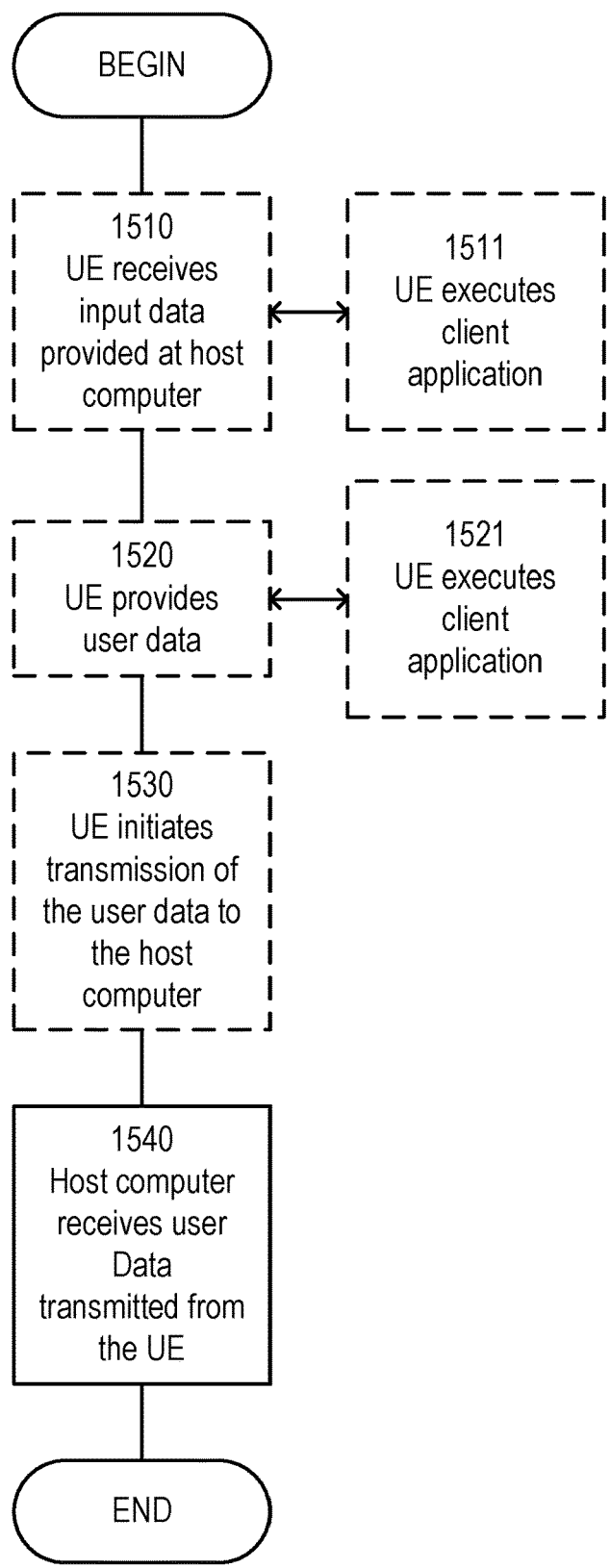
FIG. 15 illustrates methods implemented in a communication system including a host computer, a base station and a user equipment in accordance with some embodiments.

FIG. 15 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 15 will be included in this section. In step 1510 (which may be optional), the UE receives input data provided by the host computer. Additionally or alternatively, in step 1520, the UE provides user data. In substep 1521 (which may be optional) of step 1520, the UE provides the user data by executing a client application. In substep 1511 (which may be optional) of step 1510, the UE executes a client application which provides the user data in reaction to the received input data provided by the host computer. In providing the user data, the executed client application may further consider user input received from the user. Regardless of the specific manner in which the user data was provided, the UE initiates, in substep 1530 (which may be optional), transmission of the user data to the host computer. In step 1540 of the method, the host computer receives the user data transmitted from the UE, in accordance with the teachings of the embodiments described throughout this disclosure.

Figure 16:
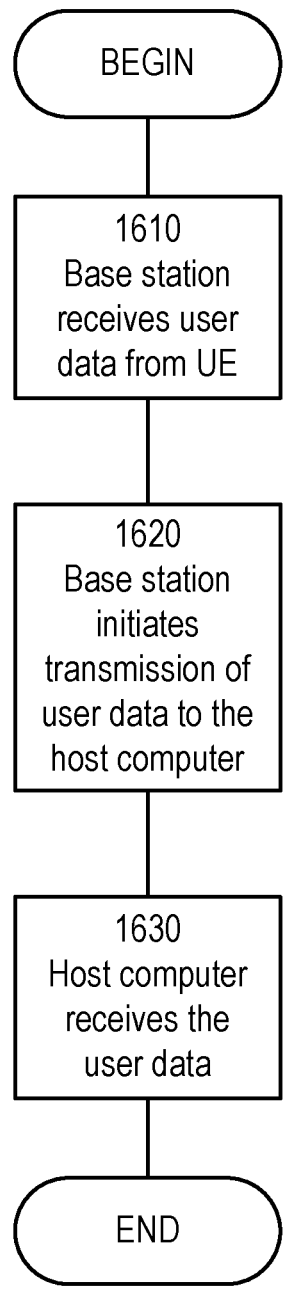
FIG. 16 illustrates methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 11 and 12. For simplicity of the present disclosure, only drawing references to FIG. 16 will be included in this section. In step 1610 (which may be optional), in accordance with the teachings of the embodiments described throughout this disclosure, the base station receives user data from the UE. In step 1620 (which may be optional), the base station initiates transmission of the received user data to the host computer. In step 1630 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

There is therefore provided methods and apparatus for estimating a channel between a first wireless device and a base station. In particular, the methods and apparatus disclosed provide channel estimations suitable for use in interference mitigation techniques.

ABBREVIATIONS

Abbreviation Explanation

CoMP Coordinated Multi-Point
C-RNTI Cell Radio Network Temporary Identifier
IRC Interference Rejection Algorithm
DM-RS Demodulation Reference Signals
HetNet Heterogeneous Network
PRB Physical Resource Block
PCI Psychical Cell Identity
eNB Evolved Node B
VoLTE Voice over LTE
PUSCH Physical Uplink Shared Channel
SINR Signal to Interference plus Noise Ratio
SNR Signal to Noise Ratio
UE User Equipment
UL Uplink
TTI Time Transmission Interval

The invention claimed is:

1. A method in a first base station in a communications network for performing channel estimation of a first wireless channel between a first wireless device and the first base station, the method comprising:
receiving a signal comprising a first component received over the first wireless channel, the first component corresponding to a first reference signal transmitted by the first wireless device to the first base station, and a second component received over a second wireless channel, the second component corresponding to a portion of a second reference signal transmitted by a second wireless device to a second base station, but received at the first base station;

receiving scheduling information according to which the second wireless device is scheduled to transmit the second reference signal to the second base station;

generating, based on the scheduling information, a constructed reference signal representative of the second reference signal; and performing the channel estimation of the first wireless channel between the first wireless device and the first base station based on the signal and the constructed reference signal by estimating the second wireless channel by calculating channel coefficients $\hat{h}_i$ for the second wireless channel as $$\hat{h}_i = \frac{1}{K}\sum_{m=0}^{K-1} y(m)s_i^*(m),$$

where m is a subcarrier index, K is a number of subcarriers, $s^*_i(m)$ is a complex conjugate of the respective constructed reference signal generated from scheduling information received from the second base station, and y(m) is the signal.

2. The method as claimed in claim 1, wherein the generating the constructed reference signal is performed responsive to a determination that radio resources scheduled for use to transmit the second reference signal overlap the first reference signal.

3. The method as claimed in claim 1, wherein the second component corresponds to N second reference signals transmitted by N respective second wireless devices, where N is greater than or equal to 1.

4. The method as claimed in claim 3, wherein the scheduling information comprises scheduling information according to which each of the N second wireless devices is scheduled to transmit each respective second reference signal.

5. The method as claimed in claim 4, wherein the method further comprises generating, based on the scheduling information, N constructed reference signals representative of each of the N second reference signals.

6. The method as claimed in claim 1, wherein the performing the channel estimation further comprises:
a) estimating the first component $\hat{y}_1(m)$ of the signal as $$\hat{y}_1(m) = y(m) - \sum_{i=1}^{N} \hat{h}_i s_i(m).$$

7. The method as claimed in claim 6, wherein the performing the channel estimation further comprises:
b) calculating the channel estimate $\hat{h}_0$ for the first wireless channel as $$\hat{h}_0 = \frac{1}{K}\sum_{m=0}^{K-1} \hat{y}_1(m)s_0^*(m),$$

where $s^*_0(m)$ is a complex conjugate of the first reference signal.

8. The method as claimed in claim 7 further comprising: estimating the second component of the signal as $\hat{y}_2(m) = y(m) - \hat{h}_0 s_0(m);$ updating the estimate of the channel coefficients $\hat{h}_i$ for signals from the second wireless device as $$\hat{h}_i = \frac{1}{K}\sum_{m=0}^{K-1} \hat{y}_2(m)s_i^*(m);$$

and performing a) and b) using the updated estimate of the channel coefficients $\hat{h}_i$.

9. A first base station operable in a wireless communications network for performing channel estimation of a first wireless channel between a first wireless device and the first base station, the first base station comprising:
a processor; and
a memory containing instructions which, when executed by said processor, cause the first base station to perform operations to:
receive a signal comprising a first component received over the first wireless channel, the first component corresponding to a first reference signal transmitted by the first wireless device to the first base station, and a second component received over a second wireless channel, the second component corresponding to a portion of a second reference signal transmitted by a second wireless device to a second base station, but received at the first base station;
receive scheduling information according to which the second wireless device is scheduled to transmit the second reference signal to the second base station;
generate, based on the scheduling information, a constructed reference signal representative of the second reference signal; and
perform the channel estimation of the first wireless channel between the first wireless device and the first base station based on the signal and the constructed reference signal by estimating the second wireless channel by calculating channel coefficients $\hat{h}_i$ for the second wireless channel as $$\hat{h}_i = \frac{1}{K}\sum_{m=0}^{K-1} y(m)s_i^*(m),$$

where m is a subcarrier index, K is a number of subcarriers, $s^*_i(m)$ is a complex conjugate of the respective constructed reference signal generated from scheduling information received from the second base station, and y(m) is the signal.

10. The first base station as claimed in claim 9, wherein the first base station further to:
generate the constructed reference signal responsive to a determination that radio resources scheduled for use to transmit the second reference signal overlap the first reference signal.

11. The first base station as claimed in claim 9, wherein the second component corresponds to N second reference signals transmitted by N respective second wireless devices, where N is greater than or equal to 1.

12. The first base station as claimed in claim 11, wherein the scheduling information comprises scheduling information according to which each of the N second wireless devices is scheduled to transmit each respective second reference signal.

13. The first base station as claimed in claim 12, wherein the first base station to generate, based on the scheduling information, N constructed reference signals representative of each of the N second reference signals.

14. The first base station as claimed in claim 9, wherein the first base station further to perform the channel estimation by estimating the first component as $$\hat{y}_1(m) = y(m) - \sum_{i=1}^{N} \hat{h}_i s_i(m).$$

15. The first base station as claimed in claim 14, wherein the first base station further to:
calculate the channel estimate $\hat{h}_0$ for the first wireless channel as $$\hat{h}_0 = \frac{1}{K}\sum_{m=0}^{K-1} \hat{y}_1(m) s_0^*(m),$$

where $s^*_0(m)$ is a complex conjugate of the first reference signal.

16. The first base station as claimed in claim 15, wherein the first base station to:
estimate the second component of the signal as $\hat{y}_2(m) = y(m) - \hat{h}_0 s_0(m)$;
update the estimate of the channel coefficients $\hat{h}_i$ for signals from the second wireless devices as $$\hat{h}_i = \frac{1}{K}\sum_{m=0}^{K-1} \hat{y}_2(m) s_i^*(m);$$

and
estimate an updated first component as:

$$\hat{y}_1(m) = y(m) - \sum_{i=1}^{N} \hat{h}_i s_i(m),$$

using the updated estimate of the channel coefficients; and
calculate an updated channel estimate $\hat{h}_0$ for the first wireless channel between the first wireless device and the first base station as $$\hat{h}_0 = \frac{1}{12}\sum_{m=0}^{11} \hat{y}(m) s_0^*(m),$$

where $s^*_0(m)$ is a complex conjugate of the first reference signal, where $\hat{y}_1(m)$ is the updated first component.

* * * * *